US010494523B2

(12) United States Patent
Holt

(10) Patent No.: US 10,494,523 B2
(45) Date of Patent: Dec. 3, 2019

(54) PARTICLE SUSPENSIONS OF FLOCCULATING POLYMER POWDERS AND POWDER FLOCCULANT POLYMER BLENDS

(71) Applicant: PSMG, LLC, Woodstock, GA (US)

(72) Inventor: Jason Holt, Ball Ground, GA (US)

(73) Assignee: PSMG, LLC, Milton, GA (US)

( * ) Notice: Subject to any disclaimer, the term of this patent is extended or adjusted under 35 U.S.C. 154(b) by 2 days.

(21) Appl. No.: 15/596,470

(22) Filed: May 16, 2017

(65) Prior Publication Data

US 2017/0247272 A1    Aug. 31, 2017

Related U.S. Application Data

(62) Division of application No. 14/092,385, filed on Nov. 27, 2013, now Pat. No. 10,011,717.

(51) Int. Cl.
| | | |
|---|---|---|
| *C02F 1/56* | (2006.01) | |
| *C08L 71/02* | (2006.01) | |
| *C08L 33/26* | (2006.01) | |
| *C02F 11/14* | (2019.01) | |
| *C08L 39/00* | (2006.01) | |

(Continued)

(52) U.S. Cl.
CPC ............ *C08L 71/02* (2013.01); *C02F 1/56* (2013.01); *C02F 11/14* (2013.01); *C08L 33/26* (2013.01); *C08L 39/00* (2013.01); *C02F 2103/10* (2013.01); *C02F 2103/28* (2013.01); *C02F 2303/00* (2013.01); *C08L 2205/025* (2013.01); *C08L 2205/03* (2013.01)

(58) Field of Classification Search
None
See application file for complete search history.

(56) References Cited

U.S. PATENT DOCUMENTS

| | | |
|---|---|---|
| 3,843,589 A | 10/1974 | Wartman |
| 3,960,584 A | 6/1976 | Savage |

(Continued)

FOREIGN PATENT DOCUMENTS

| | | |
|---|---|---|
| CA | 2023735 C | 2/1992 |
| EP | 0203817 | 12/1986 |

(Continued)

OTHER PUBLICATIONS

Archer, Sorbotil Solution, USP/FCC, p. 1, Accessed Online May 5, 2016.

(Continued)

*Primary Examiner* — Michael H. Wilson
*Assistant Examiner* — Katherine A Will
(74) *Attorney, Agent, or Firm* — Christensen, Fonder, Dardi & Herbert PLLC; Peter S. Dardi

(57) ABSTRACT

Powder blends are described comprising blends of particulate water soluble high molecular weight polymer flocculants. The polymer flocculants can include polyethylene oxide, polyacrylamide, copolymers thereof and combinations thereof. The powder blends allows the use of fine powders while reducing potential air quality and safety issues. The powder blends can be used for waste water purification, fiber dewatering, and the like. The powder blends can be diluted by a water dilution flow prior to entering a waste water stream.

17 Claims, 3 Drawing Sheets

(51) Int. Cl.
*C02F 103/10* (2006.01)
*C02F 103/28* (2006.01)

(56) References Cited

U.S. PATENT DOCUMENTS

| | | | |
|---|---|---|---|
| 4,054,514 A * | 10/1977 | Oltmann | B01D 21/0018 210/715 |
| 4,710,298 A | 12/1987 | Noda et al. | |
| 4,795,531 A | 1/1989 | Sofia et al. | |
| 4,894,119 A | 1/1990 | Baron, Jr. et al. | |
| 4,931,190 A | 6/1990 | Laros | |
| 4,943,378 A | 7/1990 | Flesher et al. | |
| 5,102,455 A | 4/1992 | Allen et al. | |
| 5,112,500 A | 5/1992 | Jones | |
| 5,178,770 A | 1/1993 | Chung | |
| 5,342,538 A | 8/1994 | Chung et al. | |
| 5,366,622 A | 11/1994 | Geyer | |
| 5,449,464 A | 9/1995 | El-Shall | |
| 5,549,820 A | 8/1996 | Bober et al. | |
| 5,650,465 A | 7/1997 | Ryan et al. | |
| 6,123,856 A | 9/2000 | Kumpera et al. | |
| 6,238,486 B1 | 5/2001 | Dunham et al. | |
| 6,358,364 B2 | 3/2002 | Keiser et al. | |
| 6,846,416 B2 | 1/2005 | Nasu et al. | |
| 6,979,405 B2 | 12/2005 | Weir | |
| 7,252,783 B2 | 8/2007 | Weir et al. | |
| 2005/0061750 A1 | 3/2005 | Fabri et al. | |
| 2005/0115907 A1 | 6/2005 | Taylor | |
| 2010/0038319 A1 | 2/2010 | Boehm et al. | |
| 2010/0213405 A1 | 8/2010 | Wensloff | |
| 2014/0158634 A1 | 6/2014 | Holt | |
| 2015/0053623 A1 | 2/2015 | Holt et al. | |

FOREIGN PATENT DOCUMENTS

| | | |
|---|---|---|
| EP | 0522334 B1 | 1/1993 |
| EP | 0536194 B | 11/2001 |
| WO | 89/06294 A1 | 7/1989 |

OTHER PUBLICATIONS

Ecolab USA Inc., Pareto Mixing Technology Brochure, © 2012, 9 pages.
Han et al., "Density, Viscosity, and Excess Properties For Aquaeous Poly(ethykene glycol) Solutions (298.15 to 323.15) K," Journal of Chemical & Engineering Data, 53(11):2598-2601 (Oct. 22, 2008).
International Search Report and Written Opinion for International Application No. PCT/US14/62671 dated Mar. 12, 2015 (12 pages).
Scheiner et al., "Dewatering Of Mineral Waste Using The Flocculant Polyethylene Oxide," Bulletin/U.S. Dept. of The Interior, Bureau of Mines; 681 (1985).
Smelley at al., "Synergism In Polyethylene Dewatering of Phosphatic Clay Waste," U.S. Department of The Interior, Bureau of Mines, 1980.
Extended Search Report For European Application No. 14865410.6 based on PCT/US2014/062671 dated Jun. 6, 2017 (8 pages).

* cited by examiner

PARTICLE SUSPENSIONS OF FLOCCULATING POLYMER POWDERS AND POWDER FLOCCULANT POLYMER BLENDS

CROSS REFERENCE TO RELATED APPLICATIONS

This application is a divisional of U.S. patent application Ser. No. 14/092,385, filed Nov. 27, 2013, which is hereby incorporated by reference herein in its entirety.

FIELD OF THE INVENTION

The invention relates to suspensions of polymer particles in a non-dissolving liquid, in which the polymers are generally suitable as flocculants for waste water treatment. The invention further relates to desirable powder flocculant particle blends. The invention further relates to use of flocculent particle suspensions and/or powder blends for the treatment of waste water, fiber dewatering and other uses.

BACKGROUND OF THE INVENTION

Various waste streams have particulate contaminants that should be removed or concentrated for proper disposal. Traditionally, ponds have been used for dewatering the sludge or slime, but ponding is undesirable due to large areas of lands needed as well as associated environmental, economic, aesthetic and safety reasons. Addition of flocculants to the waste stream can facilitate concentration of particulate wastes. In particular, phosphate mining produces clay and clay like particulates. Economic constraints drive the use of flocculants with respect to efficiency and cost of the processing. Flocculants can also be effectively used in paper mill operations with respect to treatment of wastewater as well as a sheet formation aid or other application for dewatering fibers.

SUMMARY OF THE INVENTION

In the first aspect the invention pertains to a powder blend comprising a particulate polyethylene oxide having an average molecular weight of at least about 100,000 g/mol and a particulate polyDadmac. Generally the powder has a concentration of polyethylene oxide from about 1 weight percent to about 60 weight percent.

In further aspects the invention pertains to a method for treating a liquid, the method comprising delivering a powder blend of flocculating polymers from a reservoir into an aqueous treatment stream at a selected concentration, the delivering process comprising direct delivery of powder blend into the aqueous waste flow and/or delivering the powder blend into a dilution water flow to form an initial aqueous combination that is flowed into the treatment stream within 5 minutes of forming the combination. Generally, the powder blend comprises a particulate water soluble flocculant polymer different from polyDadmac having a molecular weight of more than 100,000 g/mol and polyDadmac. Additionally, in general, the powder blend has a concentration of flocculant polymer from about 1 weight percent to about 60 weight percent, and the flocculant polymer has a particulate size providing for dissolving into water at low concentration in no more than about 5 minutes.

In other aspects, the invention pertains to a method for treating a liquid, the method comprising the step of delivering a suspension comprising a flocculating polymer from a reservoir into an aqueous waste stream at a selected concentration. In some embodiments, the delivering process can comprise delivery of the polymer suspension into a dilution water flow to form an initial aqueous combination that is flowed into the process stream within 5 minutes of forming the combination. The polymer suspension can comprise particulate polyethylene oxide suspended in a liquid polyether polyol having a molecular weight of at least about 150 g/mol.

DETAILED DESCRIPTION

Figure 1:
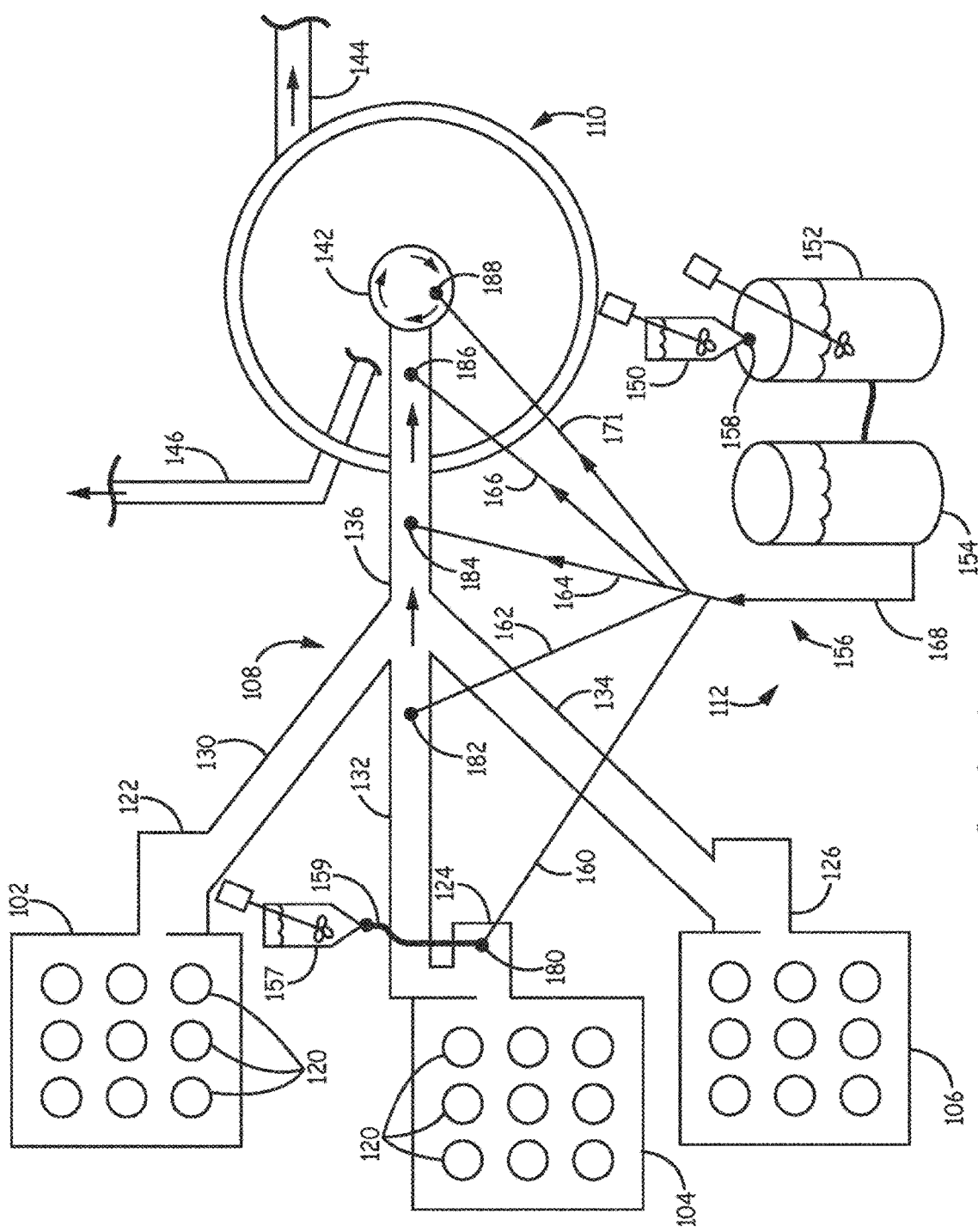
FIG. 1 is a top schematic view of the layout of a waste treatment facility involving the delivery of a polymer flocculant into a waste stream from mineral processing stations as the tailings, i.e., the waste stream, flow to a thickening tank (thickener).

A convenient format has been developed for the delivery of small particles of a flocculating polymer or polymer blends as a suspension in moderate molecular weight polyethylene glycol and/or polypropylene glycol liquid. The suspension generally has a relatively high quantity of polymer particulates for efficient delivery of the polymer particles. Desirable polymer blends can also be delivered in powder form to take advantage of desirable flocculant properties of the polymer blends. Flocculating polymers, such as polyethylene oxide, polyacrylamide, polyDadmac, Dadmac-acrylamide copolymers and combinations thereof, are generally high molecular weight water soluble polymers that can be effectively used for water quality treatment, fiber dewatering and the like. The polymer particles generally are water soluble and essentially insoluble in the liquid of the suspension, so that relatively high concentrations of the polymer can be suspended without gelling, which can increase the viscosity to undesirable levels. Handling and shipping of fine powders can be problematic for many reasons including, among others, potential air quality and safety issues. These handling and safety issues can be particularly problematic at points of delivery where flocculant chemicals are delivered from suitable storage containers, generally without access to sophisticated handling equipment and highly skilled technicians. The suspensions described herein can be adapted to simplify storage at production facilities, transportation using liquid handling containers and convenient delivery with reduced air quality issues. Similarly, the powder blends can be advantageously used to achieve desired effectiveness from the flocculants with convenient handling and suitable delivery systems adaptable for the materials. In some embodiments, the suspensions and/or powder polymer blends can be mixed at point of delivery and metered into a waste water flow that then proceeds to a settling tank or the like where the flocculating polymers settle for separation from the water. Similarly, a suspension and/or polymer blend can be used to deliver flocculating polymers for fiber dewatering both for waste water treatment and paper formation.

Polymers generally used as flocculants are water soluble high molecular weight compositions. Flocculant polymers can be useful for the treatment of various water flows such as involve in coal mining, mineral mining operation, fiber dewatering, paper processing or paper sheet formation operations. Such processing with flocculant polymers can be useful to provide or facilitate water clarification, suspended solids separation, treatment flow thickening, dissolved air floatation, selective mineral separation, dredging, belt press or centrifuge dewatering, settling pond or reservoir impoundment, paper sheet formation, stickies control, paper drainage aid, and/or fiber dewatering. While the polymers are generally water soluble, the flocculants tend to agglomerate and form colloids at appropriate concentrations in water, which may be driven at least in part by the presence of particulate or fibrous contaminants in the wastewater. Due to colloid formation and agglomeration, the flocculants with trapped impurities can settle from the flow. As described further below, settling tanks can be used to separate flocculants with trapped impurities from the liquid so that purified water can be separated from agglomerated flocculants/waste, which can be separately removed for further processing. Polymer blends can introduce particular efficacy of each polymer that has been found to provide for improved effectiveness overall based on total polymer use. As described herein, in some embodiments, the polymers can be selected so that simultaneous addition to a waste stream can be particularly effective to take advantage of the properties of the respective polymers.

Polyethylene oxide is typically supplied as a fine free flowing powder used for the manufacture of a number of different pharmaceutical and personal care applications. Commercially, there are a few various grades of polyethylene oxide particle sizes available to end users. In manufacture, some polyethylene oxide powders are screened to remove the unwanted, extremely fine polyethylene oxide powder (fines). In the end use application, the extremely fine properties of the screened fines make handling difficult. The dust further limits the by-products' end uses. The suspensions described herein provide a convenient and safe approach for the effective use of ultrafine polymer particles. Based on the discovery of the convenient approach for the delivery of PEO powders, this approach has been found to be similarly convenient for the delivery of other high molecular weight flocculating polymers.

In corresponding embodiments, the suspensions comprise solid and liquid components. In particular, with respect to solid components, the suspensions generally can comprise from about 5 weight percent to about 60 weight percent flocculant polymer particles, in further embodiments from about 10 weight percent to about 55 weight percent, and in additional embodiments from about 12 weight percent to about 50 weight percent flocculant polymer particles. The liquid of the suspension generally comprises a liquid polyether polyol, e.g., diol or triol, with oxyethylene repeat units along the polymer backbone, which generally have moderate molecular weights, such as polyethylene glycol (PEG, HO—$(CH_2$—$CH_2$—O—$)_n$H), propylene glycol (PPG, HO—$(CH_2$—$CHCH_3$—O—$)_n$H), copolymers thereof or a mixture thereof (PEG/PPG) as the primary component or only component. PEG and PPG are ethers with two terminal hydroxyl groups and can be moderately viscous compositions, which influences the viscosity of the suspension. Glyceryl ether polymers are commercial polymers with PEG or PPG reacted with a glycerine molecule to form an ether linkage with the resulting molecule having three terminal hydroxyl groups. (Dow®, PT-series of polymers).

Specifically, the liquid of the suspension can comprise at least about 75 weight percent, in further embodiments at least about 80 weight percent and in additional embodiments at least about 90 weight percent PEG/PPG. Polymers generally have a distribution of molecular weights, and the PEG generally has an average molecular weight from about 200 g/mole to about 700 g/mole and in further embodiments from about 300 g/mole to about 650 g/mole. PEG 400 (average molecular weight 380-420), PEG 600 (average molecular weight 580-620) and mixtures thereof can be effectively used. Polypropylene glycols can have suitable viscosities at average molecular weights in the several thousands, and are commercially available, for example, from Dow Chemical. Glyceryl ether polymers with three terminal hydroxyl groups are similarly commercially available with similar viscosities and other properties. Also, copolymers ethylene oxide and propylene oxide are commercially available. The liquid can be selected to not significantly dissolve the polymer particles. While the suspensions can consist essentially of flocculant polymer particles and liquid polyether glycol, e.g., PEG/PPG, other minor components can be included in the suspension if desired to modify the properties of the suspension, such as coloring agents, viscosity modifiers, surfactants, or the like, generally in amounts of no more than about 5 weight percent each.

Polyethylene glycol (PEG), polyethylene oxide (PEO), or poly(oxyethylene) (POE) refers to an oligomer or polymer of ethylene oxide. The three names are chemically synonymous, but historically PEG has tended to refer to oligomers and polymers with a molecular mass below 20,000 g/mol, PEO to polymers with a molecular mass above 20,000 g/mol, and POE to a polymer of any molecular mass. PEG compositions can be liquids or low melting solids, depending on the molecular weights of the polymer. PEG 400 generally refers to a PEG formulation with an average molecular weight between 380 g/mole and 420 g/mole. PEG 400 is commercially available, for example, as Dow CARBOWAX™ PEG 400. PEG 600 generally refers to a PEG formulation with an average molecular weight between 570 g/mole and 630 g/mole. Above a molecular weight of roughly 800 g/mole, PEG can be a waxy paste like material at room temperature.

Polyethylene oxide can be represented by the formula H—(O—$CH_2$—$CH_2)_n$—OH, where n refers to the degree of polymerization, and for high molecular weight polymers, n is large. Low molecular weight variations of this polymer can be called polyethylene glycol or PEG. The nature of the polymer can be characterized by the average molecular weight and suitable polymers can be linear or branched. In some embodiments, the average molecular weight of the polyethylene oxide can be at least about 100,000 g/mol, in further embodiments at least about 1 million g/mol, in other embodiments from about 3 million g/mol to about 15 million g/mol, and in additional embodiments from about 4 million g/mol to 11 million g/mol. A person of ordinary skill in the art will recognize that additional ranges of polyethylene oxide (PEO) molecular weight within the explicit ranges above are contemplated and are within the present disclosure. Suitable commercial high molecular weight polyethylene oxides are available from Dow Chemical, for example, Polyox WSR™ 308 or UCARFLOC™ 309, 304, etc. Particles of high molecular weight PEO in commercial distribution generally have an average particle diameter of roughly 150 microns, and the particle may be sieved to reduce the presence of small particles, such as particles with a diameter less than about 75 microns. These commercial PEO materials can be conveniently distributed in the suspensions described herein. Based on the suspensions described herein, polymer particles with a small average particle diameter as well as mixtures of particles with various particle sizes can be conveniently handled. In some embodiments, the PEO particles (PEO fines) can comprise at least about 10 weight percent particles with a particle diameter of no more than about 75 microns, in further embodiments at least about 60 weight percent with a particle diameter of no more than about 75 microns, in additional embodiments at least about 80 weight percent with a particle diameter of no more than about 75 microns, and in other embodiments at least about 10 weight percent with a particle diameter no more than about 50 microns. A person of ordinary skill in the art will recognize that other particle size distributions within the explicit ranges above are contemplated and are within the present disclosure.

Polyacrylamide is represented by the formula —(CH$_2$CH(CONH$_2$))$_n$—, which is an amide form of polyacrylic acid. Copolymers of acrylamide can be similarly referred to as an acrylamide, and various copolymers introduce an ionic character into the polymer. For example, some polyacrylamides are copolymers of acrylamide and acrylic acid. Thus, a polyacrylamide can be non-ionic, anionic, cationic or amphoteric, and generally these various forms of polyacrylamide are suitable for forming the synergistically improved flocculant compositions. Charged polyacrylamides can be designed with varying amounts of copolymers constituents to vary the amount of charge, e.g., with charged monomers generally varying from about 10 to about 50 percent of the polymer chain. The lab bench results below suggest that the charge is not a significant parameter for the flocculant function of the polyacrylamides in the polymer blends. In general, anionic polyacrylamides have found use in the waste stream treatment process. The molecular weight of the polyacrylamide has been found to be a significant aspect with respect to the discovered improvement of the polymer blends. In particular, it is generally desirable for the polyacrylamide to have a higher average molecular weight relative to the average molecular weight of the polyethylene oxide. Generally, the polyacrylamide has an average molecular weight of at least about 16 million g/mol, in further embodiments at least about 18 million g/mol, and in further embodiments at least about 19 million g/mol, and particularly improved results have been discovered for polyacrylamides with an average molecular weight of at least 22 million g/mol, in further embodiments at least about 22.5 g/mol, in some embodiments at least about 23 million g/mol, in additional embodiments at least about 24 million g/mol and in other embodiments at least about 25 g/mol. A person of ordinary skill in the art will recognize that additional ranges of molecular weights within the explicit ranges above are contemplated and are within the present disclosure. Suitable high molecular weight polyacrylamides are available commercially, for example, from Kemira™ (e.g., 130A 18-20M mw), SNF Floeger™ (e.g., 934VHM 20-22M mw) and Hengju Polymers (Hengflox™).

Recently it has been discovered that synergistic flocculant properties can be obtained from a blend of very high molecular weight PEO and polyacrylamides. For the desirable blends, in general, the polyethylene oxide has an average molecular weight of at least 1 million grams/mole (g/mol), and the polyacrylamide generally has an average molecular weight of at least about 22.5 million g/mol. Generally, the polymer blend has a weight ratio of polyethylene oxide to polyacrylamide from about 0.667 to about 5, in further embodiments from about 0.75 to about 4.5, in additional embodiments from about 0.85 to about 4.25, and in other embodiments from about 1 to about 4. Also, the polymer blend can comprise at least about 35 weight percent polyethylene oxide, in further embodiments from about 45 weight percent to about 90 weight percent, and in additional embodiments from about 50 weight percent to about 85 weight percent polyethylene oxide. A person of ordinary skill in the art will recognize that additional ranges within the explicit composition ranges above are contemplated and are within the present disclosure. These blends can be directly formed into the suspensions described herein for convenient shipping and delivery for use of the polymer blends. These blends of PEO and polyacrylamides are described further in copending U.S. publication number 2014/0158634 to Holt, entitled "Polymer Blends for Flocculation," incorporated herein by reference.

PolyDadmac or polydiallyldimethylammonium chloride (($C_8H_{16}NCl$)$_n$) is a cationic homopolymer that can be useful as a flocculant agent. Copolymers of Dadmac and acrylamides as well as other copolymers of Dadmac are similarly available commercially and are similarly suitable flocculant applications as an anionic, cationic or neutral copolymer. PolyDadmac and copolymers thereof generally can have an average molecular weight of at least about 100,000 g/mole, in further embodiments at least about 1,000,000 g/mole and can be desirable at average molecular weights of about 5,000,000 to 30,000,000 g/mole. PolyDadmac can be effectively provided in small particulate form, e.g., microbeads, or in larger particulate sizes, such as granules. For flocculant use, polyDadmac particles generally have an average particle diameter from about 0.5 microns to about 150 microns. A person of ordinary skill in the art will recognize that additional ranges of average particle diameter within the explicit ranges above are contemplated and are within the present disclosure. PolyDadmac generally can be dissolved in water at high concentrations as a viscous liquid without gel formation, but the suspensions described herein of polyDadmac can be desirable for flocculant applications. In particular, in contrast with some other flocculant polymers polyDadmac has been found to be more effective as a flocculant when added in particulate form directly into a waste stream without first dissolving in water. While the delivery of liquid polymer solutions is convenient from a handling perspective, the desirability of delivery of particulate polyDadmac into a waste water flow is described in European patent 0536194B to Payne et al., entitled "Purification of Aqueous Liquor," incorporated herein by reference. Through the delivery of the suspensions described herein, the convenience of liquid phase delivery can be combined with the advantages of the delivery of undissolved polyDadmac into the waste water flow.

The suspensions thus provide a mechanism for liquid delivery of the particulate polyDadmac to provide for desirable handling while obtaining the good performance provided by the particulate material. In the suspensions described herein, particles of polyDadmac or (Dadmac-acrylamide)copolymers are similarly suspended in a non-dissolving fluid of polyether polyol, e.g., PEG/PPG. Additionally, blends of PEO and polyDadmac can be desirable with respect to the resulting flocculant properties. Generally, a polymer blend for delivery as a suspension can have a weight ratio of polyethylene oxide to polyDadmac from about 0.667 to about 5, in further embodiments from about 0.75 to about 4.5, in additional embodiments from about 0.85 to about 4.25, and in other embodiments from about 1 to about 4. Also, the polymer blend of polyDadmac and PEO for delivery as a suspension can comprise at least about 35 weight percent polyethylene oxide, in further embodiments from about 45 weight percent to about 90 weight percent, and in additional embodiments from about 50 weight percent to about 85 weight percent polyethylene oxide. A person of ordinary skill in the art will recognize that additional ranges within the explicit composition ranges above are contemplated and are within the present disclosure.

Powder blends of polyDadmac and a distinct flocculant polymer, such as polyethylene oxide (PEO) and/or polyacrylamide, have been similarly found to provide for desirable handling while obtaining the good performance provided by the individual particulate materials. In particular, the powder blends described herein reduce the handling problems associated with very fine polyethylene oxide powders and improve flowability through dry feed equipment. Similarly, the blends provide improved flocculant function for a quantity of polymer based on the desirable effects of using polyDadmac in combination with other flocculant polymers. In general, the polymer blend of polyDadmac and distinct flocculant polymer, such as PEO, can comprise at least about 5 weight percent polyDadmac, in some embodiments at least about 10 weight percent polyDadmac, in additional embodiments at least about 35 weight percent polyDadmac, in further embodiments from about 40 weight percent to about 95 weight percent and in other embodiments from about 45 to about 85 weight percent PolyDadmac. The remaining weight of the blends generally comprises one or more other particulate flocculant polymers, such as PEO, polyacrylamide or blends there, although a small amount of additives, such as a flow agent can be added. With respect to PEO, especially PEO fines, as the distinct flocculant polymer, the powder blend can comprise from about 1 weight percent to about 60 weight percent polyethylene oxide, in further embodiments from about 5 weight percent to about 55 weight percent, and in additional embodiments from about 10 weight percent to about 50 weight percent polyethylene oxide. The blends can improve handling and reduce dust issues that may otherwise be encountered with the PEO fines. In some embodiments, powdered polyethylene oxide can be a fine PEO powder with an average particle diameter of no more than about 75 microns and in further embodiments no more than about 50 microns. As noted above, the PEO particulates can be described with respect to distributions of particle sizes, and these distributions can be applied also to the powder blends. A person of ordinary skill in the art will recognize that additional ranges within the explicit composition ranges above are contemplated and are within the present disclosure.

The powders blends can be assembled using, for example, commercial mixers designed for powder handling. In general, the blending can be performed in a batch or more continuous type processing. For batch mixing, appropriate amounts of each powder are placing into a mixing vessel, which can have mixing blades or the like. For more continuous blending, an auger or screw conveyor or the like can be used with a feed into the device to provide the desired polymer ratios. Following mixing of the powders to form a homogeneous blend, the powders can be bagged or placed in another suitable container for distribution. In alternative embodiments, the powder blends are formed on site in which the mixing is performed shortly prior to use. In any case, blended powders can be placed in a suitable hopper for metered delivery.

The addition of polyethylene oxide can result in larger flocs and therefore the ability to reduce the amount of polyDadmac used to create a clear supernatant. PEO dissolves quickly, especially for the fine PEO particles, allowing for a rapid flocculation properties with a corresponding reduction of surface area of suspended particulates in the flow. Residual suspended turbidity, such as suspended anionic material, can be attracted to and agglomerated by the positively charged Dadmac to produce a clearer supernatant with a reduced amount of polyDadmac.

To achieve the desired purpose of the suspension embodiments, the suspensions do not need to be stable and as a general matter may not be, although it is not problematic if the suspensions are coincidently stable. Stability in this context is intended to mean that a well mixed suspension remains homogenous. In general, the suspensions separate with the solids concentrating toward the bottom of a container due to gravity. However, the suspensions can be mixed to form a homogenous suspension when desired, such as for delivery for a particular application, as described further below.

In contrast to the suspension described herein, stable suspensions of PEO have been described in U.S. Pat. No. 3,843,589 to Wartman (Wartman '589 patent), entitled "Stable Pumpable Slurries of Ethylene Oxide Polymers," incorporated herein by reference. To achieve the stable suspension, the Wartman '589 patent described a more complex liquid to achieve a suitable density, certain specific polymer parameters, a very high viscosity suspension In contrast, the present suspensions may not be stable, but they have significantly lower viscosities for easier delivery and simpler formulations. The liquids used for the suspensions generally have a viscosity at 25° C. in some embodiments of no more than about 400 centipoise (cP), in other embodiments no more than about 300 cP and in further embodiments no more than about 250 cP. The well blended suspension can have a viscosity at 25° C. of no more than about 1000 cP, further embodiments no more than about 850 cP and in additional embodiments no more than about 750 cP.

For use, the suspended flocculant polymers can be diluted with water prior to delivery into the waste stream or other delivery stream. The polyether polyol generally mixes with water and the flocculant polymer generally dissolves. During the dissolving/make down step, the liquid state of the polymer suspension improves initial distribution of polymer particles compared to an equivalent dry fed product that may experience clumping during the wetting phase. Testing has shown that PEO particles delivered with the suspension into water results in rapid dissolving of the PEO, and it is expected that the other polymer should exhibit similar rapid dissolving. The suspension can be delivered from a suitable mixer to provide for delivery of a uniform composition, generally in selected metered amounts, and delivered into a container for dilution with water. The flocculant polymer compositions is generally formed into a dilute aqueous solution generally at a concentration from about 0.0005 to about 0.2 weight percent, in further embodiments from about 0.001 to about 0.1 weight percent and in additional embodiments from about 0.002 to about 0.05 weight percent flocculant polymer(s). A person of ordinary skill in the art will recognize that additional ranges within the explicit ranges above are contemplated and are within the present disclosure.

Flocculants are useful for the treatment generally of waste streams, generally from mines, to agglomerate particulates that can then settle from the waste stream and to facilitate concentration of the particulates. Mines generally produce flow of relatively dilute waste stream with tailings, also referred to as mineral slimes. To reasonably dispose of the mineral slimes, the concentration of particulates can be concentrated. The polymer flocculants described herein can be effective to form flocculants, for example, with clay, claylike waste or other silicate or metal oxide particulate waste, which can be produced in various mining operations, such as phosphate mining, bauxite mining, coal washing, dredging, talc mining, other sand mining deposits, alumina processing and the like. The dissolved polymer flocculants can be injected into the stream containing suspended solids that is then directed to a settling tank, or the like. Processing with the polymer flocculants is described further below.

With the use of a polyacrylamide flocculant and/or a polyDadmac flocculant, the flocculant is generally added in part early in the waste flow with optional additional portions added along the flow to drive a relatively slow flocculation process to a relatively effective end point. With the use of polyethylene oxide alone, it is generally desirable to add the flocculant essentially at or near the point of entry of the waste flow into a settling tank due to the relatively rapid flocculation effect. With respect to the polymer blends, the flocculant can be added upstream in the waste flow from the entry point into the settling tank or center well. Proper mixing of a polymer blend facilitates this earlier delivery without interfering with the desirable flow of the waste stream through conduits leading to a settling tank. If the polymers are delivered in a water dilution flow, the degree of dissolving can be controlled to yield a desired state of the material when delivered into the waste stream, fiber dewatering site or other site for use. An earlier delivery of flocculant provides for improved mixing within the waste flow, which can result in the reduced use of flocculant while improving the effectiveness of the flocculant. In particular, in some embodiments a polymer flocculant is added at least 10 meters upstream from a port, e.g., central inlet, into a settling tank.

Flocculant polymer particle suspensions or powder polymer blends can be added directly to a waste stream, or can be added by using a water flow delivery to pre-dilute the flocculant polymer component prior to entering the waste stream. The use of a water dilution flow allows for one or more of the flocculant polymers to be dissolved to a desired degree prior to entering the waste stream. Any reasonable water source can be used to generate the water dilution flow. When a water dilution flow delivery is used, a selected flow of water with an amount of the polymer powder blend is directed into the waste stream. To control the degree of solubilization of the polymer particles especially the polyDadmac, the powder blend or suspension is added to this dilution flow to create an initial aqueous combination. The selected rate of flow can be based on the solubility of the flocculants, the desired dissolution of the flocculants prior to entering the waste stream and the physical configuration of the components. In some embodiments, the powder blend, for example, can be diluted no more than about 5 minutes prior to entering the treatment stream, in further embodiments no more than about 2 minutes, in other embodiments no more than 60 seconds, in further embodiments no more than 30 seconds, in further embodiments from about 1 to about 20 seconds, and in further embodiments from about 5 to about 15 seconds prior to entering the treatment stream, fiber dewatering site, or other use location. A representative configuration for a water dilution flow within a treatment system is shown below. The use of a water dilution flow allows for flocculant polymer particles to dissolve prior to entering the waste stream, while polyDadmac particles may only dissolve significantly after entering the waste stream. A person of ordinary skill in the art will recognize that additional ranges within the explicit time ranges above are contemplated and are within the present disclosure.

A representative configuration of a waste treatment facility for the treatment of waste water with mining tailings is shown in FIG. 1. The waste treatment facility for a mining operation comprises mineral processing stations 102, 104, 106, slime flow conduit system 108, thickening tank 110 and polymer flocculant delivery system 112, which in particular is suitable for polymer suspension delivery. The configuration of the mineral processing stations can depend on the particular mining operation, and these stations can comprise hydrocyclones 120 or the like or other suitable purification equipment to separate crudely purified mineral ore from slimes, i.e., dilute tailing waste from the mineral separation. In some embodiments, a mineral processing station can comprise a head box 122, 124, 126 to direct slime/waste flow from a mineral processing station to the waste flow conduit system. While FIG. 1 shows three mineral processing stations 102, 104, 106, in other embodiments a waste facility may interface with a single mineral processing station, two, four, five or more than five mineral processing stations.

Slime flow conduit system 108 provides for flow of the waste stream from mineral processing stations 102, 104, 106 to thickening tank 110, and generally slime flow conduit system 108 interfaces with polymer flocculant delivery system 112 at one or more points. With the configuration shown in FIG. 1, slime flow conduit system 108 comprises flow lines 130, 132, 134 that lead to combined flow line 136. Flow lines 130, 132, 134, respectively connect to head boxes 122, 124, 126 to receive slimes from mineral processing stations 102, 104, 106, respectively. The size and construction of flow lines 130, 132, 134, 136 can be designed based on the particular mining operation and corresponding waste volumes, and flow limes 130, 132, 134, 136 can be pipes, open or closed ducts or any other suitable flow structure. For a representative phosphate mining operation flow lines 130, 132, 134 can be pipes with a diameter of roughly 10-40 inches, and combined flow line 136 can be a pipe with a diameter of roughly 30-60 inches, but the basic teachings herein can apply to a range of processing operations and mining volumes. As noted above, a particular system can comprise a different number of mineral processing stations and corresponding modifications to slime flow conduit system 108 follow from the teachings herein.

Thickening tank 110 can comprise a tank structure 140, a central inlet 142, a clarified water outflow 144 and a tailings outflow 146. Tank structure 140 can have a suitable volume for the particular mining operation size. Central inlet 142 provides an interface with combined flow conduit 136 such that slime can enter the tank structure 140. Central inlet 142 can be simply an end opening of combined flow conduit 136, but in some embodiments, central inlet 142 can comprise a circular ring like structure with optional mechanical mixing to provide for a mixed slime flow into tank structure 140 to facilitate flocculation. In the thickening process that takes place in tank structure 140, the flocculates solids have a higher density and fall to the bottom of the tank, and less dense clarified water can be found near the top of the tank. Clarified water outflow 144 can be configured to take off water from near the top of the tank, such as the top 20%-40% of the tank volume and in further embodiments the top 10% of the tank volume, and in general near the edge of the tank. Similarly, tailings outflow 146 can be configured to withdraw concentrated tailings from the flocculation process near the bottom of the tank and in some embodiments toward the center of the tank, in some embodiments from the bottom 20% of the tank volume and in further embodiments from the bottom 10% of the tank volume. A person of ordinary skill in the art will recognize that additional ranges of positions for water removal within the explicit ranges above are contemplated and are within the present disclosure.

Referring to FIG. 1, polymer flocculant delivery system 112 comprises a polymer suspension reservoir 150 that can comprise a mixer to maintain a relatively homogenous form of the suspension, a mixing/dilution tank 152, a storage tank 154 and feed lines 156. Polymer suspension reservoir 150 generally holds a desired quantity of the selected polymer blend and can comprise a feed valve 158 or the like to provide for the placement of a selected amount of polymer into mixing/dilution tank. Polymer suspension reservoir generally can provide continuous mixing of the polymer suspension so that a homogenous polymer suspension can be meter out of the reservoir. Mixing/dilution tank 152 generally has an appropriate mixing element and can be configured generally to operate in a batch or continuous mode of operation. Water is generally correspondingly delivered into mixing/dilution tank 152 to provide a desired concentration of polymer solution, as described above. The mixed polymer solution can be pumped or otherwise flowed for storage to storage tank 154 for delivery as needed to the waste stream through feed lines 156. In alternative embodiments generally for the delivery of a suspension comprising polyDadmac, polymer suspension reservoir 150 can be configured for direct delivery of polymer suspension into feed lines 156 or a portion thereof. Referring to FIG. 1, a mixing flocculant reservoir 157 is configured for direct delivery of a flocculant suspension through line 159 to head box 124, which can be, for example, desirable for the delivery of a suspension of polyDadmac or copolymers thereof.

Figure 2:
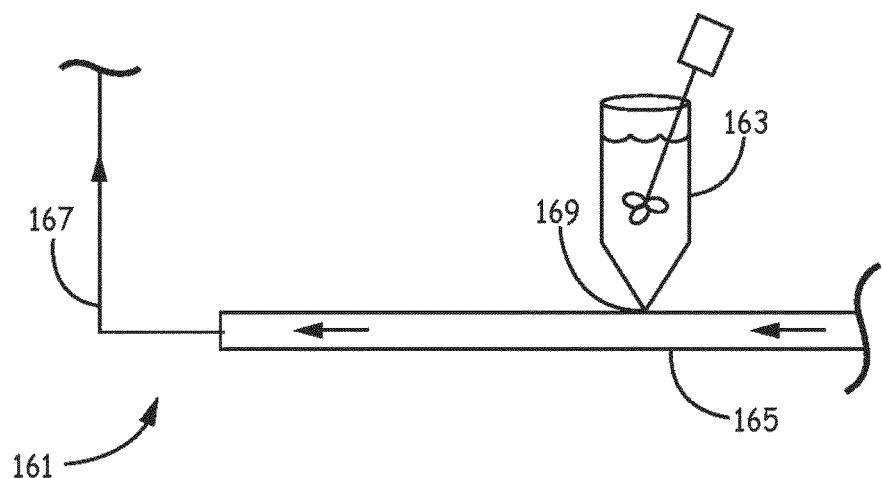
FIG. 2 is fragmentary schematic view of the suspension delivery system configured to direct flocculant polymers into the waste stream using a water dilution flow.

As noted above, it can be desirable to directly deliver the polymer particle suspensions with dilution water without storage in a reservoir with an aqueous solution. The use of direct delivery with a dilution water flow provides for more controlled dissolving of the polymer particles. Referring to FIG. 2, direct polymer flocculant delivery system 161 comprises a polymer suspension reservoir 163 that can comprise a mixer to maintain a relatively homogenous form of the suspension, a water supply line 165, and feed line 167. Polymer suspension reservoir 163 generally holds a desired quantity of the selected polymer blend and can comprise a feed valve 169 or the like to provide for the placement of a selected amount of polymer into the water supply line 165 at a predetermined rate. Polymer suspension reservoir 163 generally can provide continuous mixing of the polymer suspension so that a homogenous polymer suspension can be metered out of the reservoir. The water supply line 165 generally has a controlled flow rate selected to allow for proper dissolution of the polymers prior to entering the waste stream as described above. The length of time the polymer is in the water flow can be determined by the length of the pipe, the diameter of the pipe, the flow rate or a combination thereof. The arrows indicate the direction of the flow. In some embodiments, the diameter of the water supply pipe 165 can be about 0.1 inch to about 1 inch, although particular application generally suggest desired flow volumes. Feed line 167 can connect, for example, with the feed line 156 or with feed line 159 or other alternative configurations to have desired flow lengths and flow volumes based on selected delivery points for the delivery of a suspension of polyDadmac, copolymers thereof, PEO, polyacrylamides and/or selected blonds thereof.

Feed lines 156 provide for flow from storage tank 154 to slime flow conduit system 108, and pumps can be used as appropriate to drive the flow. As shown in FIG. 1, feed lines 156 comprise 5 branch feeds 160, 162, 164, 166, 171 from main feed line 168, which connects with storage tank 154. The feed lines can be appropriate pipes or other conduits. Branch feeds 160, 162, 164, 166, 171 connect between main feed line 168 and delivery connections 180, 182, 184, 186, 188 that connect with corresponding points of the slime flow conduit system. As shown in FIG. 1, delivery connection 180 is located at head box 124, delivery connection 182 is on flow conduit 132, delivery connections 184, 186 are located at different points on combined flow conduit 136, and delivery connection 188 is located at central inlet 142. In additional or alternative embodiments, a different number of branch flow conduits can be used, such as 1, 2, 3, 4, 6 or more than 6, and the positions of the delivery connections can be altered as desired. Similarly, a system can comprise more than 1 polymer flocculant delivery system if desired to supply polymer solution to various delivery connections.

As noted above, based on the improved polymer blends described herein the solution of the polymer blend can be effectively added at selected locations along the slime flow. While polyethylene oxide alone as a flocculant has desirable properties, the flocculant action of the polyethylene oxide is most effective when the flocculant solution is added essentially at the central inlet into the thickening tank, e.g., delivery connection 188 in FIG. 1. The delivery of a polymer flocculant solution at or near the central inlet limits the mixing with the waste stream prior to entry into the thickening tank. It has been discovered that some flocculant polymer blends described herein provide for earlier introduction into the waste flow to provide better mixing with the waste flow. Overall the polymer blends provide outstanding flocculant function and improved delivery flexibility. In contrast with high molecular weight polyethylene oxide alone, flocculant polymer blends can be delivered effectively through a delivery port into the slime flow at least 10 meters from the port connecting the waste flow with the thickening tank settling zone, in further embodiments at least about 12 meters and in additional embodiments from 15 meters to the initiation of the waste flow adjacent to the mineral processing station. A person of ordinary skill in the art will recognize that additional ranges of distances within the explicit ranges above are contemplated and are within the present disclosure.

For the delivery of powder particle blends, polymer flocculant delivery system 112 or portions thereof can be replaced with appropriate components for the delivery of the polymer blend. For example, a reservoir of powder can be directly connected at delivery connections 180, 182, 184, 186, 188. The powder blends can then be directly delivered at selected rates into the flow. As noted above, in some embodiments, a dilution water flow can be used to deliver the polymer blend with some dissolving of the flocculant polymer. A diluted flocculant blend delivery system can be directed individually to one or more delivery connections and/or to branched feeds directed to two or more delivery connections.

Figure 3:
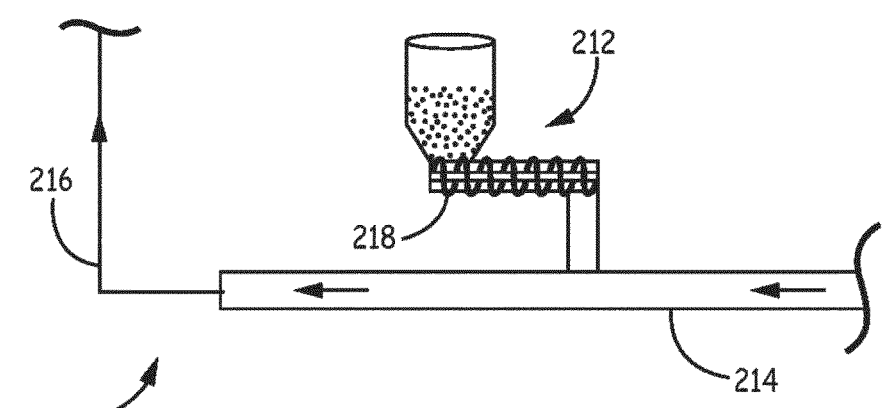
FIG. 3 is a fragmentary schematic view of the dry powder delivery system configured to direct flocculant polymers into the waste stream using a water dilution flow.

FIG. 3 shows a system configured for the delivery of a flocculant power, e.g. a flocculant powder blend, into a dilution water flow for delivery to a waste processing system. Referring to FIG. 3, polymer powder delivery system 210 comprises a powder polymer blend hopper 212, a water supply line 214, and a feed line 216. Powder polymer blend hopper 212 generally holds a desired quantity of the selected polymer blend and can comprise a valve with a gravity feed, helical auger 218 or other mechanical feed, or the like to provide for the placement of a selected amount of powder polymer blend into the water supply line 214 at a predetermined rate. The water supply line 214 generally has a controlled flow rate selected to allow for desired dissolution of the polymers prior to entering the waste stream as described above. The length of time the polymer is in the water flow can be influenced by the length of the pipe, the diameter of the pipe, the flow rate, or a combination thereof. In some embodiments, the diameter of the water supply pipe 214 can be from about 0.1 inch to about 1 inch, although the pipe parameters may be significantly influenced by the particular application. Arrows indicate the direction of the flow. Water supply line 214 can connect with the feed lines 156, feed line 159 or other desired configuration to connecting to selected delivery connections 180, 182, 184, 186, 188 with a selected length of pipe for the delivery of a selected flocculant powdered polymer or blends thereof.

While the polymer flocculants can be effectively used in various waste processing situations and/or fiber dewatering processes, it is instructive to review a representative procedure. For example, a slime flow coming from the mineral processing stations can have a solids concentration from about 1 weight percent to about 12 weight percent. The objective can be to concentrate to solids in the waste to levels generally from about 15 to about 45 weight percent and in further embodiments from about 20 to about 35 weight percent in the under flow removed from the thickening tank. The clarified water removed from the thickening tank can have at least about 90 percent, in some embodiments at least about 95 percent, and in further embodiments at least about 99 of the initial solids removed. In general, the volume of polymer flocculant solution is added in a dosage from about 1 parts per million by weight (ppm) to about 50 ppm, in some embodiments from about 5 ppm to about 40 ppm, and in further embodiments from about 10 ppm to about 30 ppm of polymer flocculant within the treated slime flow, i.e., 1 part polymer per million parts of waste water by weight assuming that the waste water is 1 kg per liter. A person of ordinary skill in the art will recognize that additional ranges of processing parameters within the explicit ranges above are contemplated and are within the present disclosure. The improved polymer blends and/or the improved delivery of the polymer blends provide for a reduced use of polymer in order to achieve a desired high purity of water effluent.

In addition to cleaning mining sewage, the flocculant polymers can be effectively used in other waste water treatment context, such as to remove fibrous particulates from waste streams. Thus, flocculant polymers can be effectively used for waste water treatment from paper mills and the like. Paper mill dewatering processes can be performed to form fiber cakes that can be recycled into useful materials. Thickening of fiber sludge can be performed by filtration or sedimentation, such as with clarifiers or floatation units. To facilitate cake formation, the dewatering process can involve screw presses, belt presses, centrifuges or other dewatering of waste fibers. A fiber cake can have a solid content of at least about 20 weight percent and in some embodiments at least about 25 weight percent. The initial sludge can have a solid content generally from roughly 1 weight percent to about 15 weight percent. The use of flocculant polymers generally for the treatment of waste streams from paper mills, pulp mills or deinking plants is described generally in U.S. Pat. No. 6,123,856 to Kumpera et al., entitled "Dewatering of Sludges," incorporated herein by reference.

Furthermore, flocculant polymers can be useful as fiber retention agents in paper making processes and the like for fiber materials. Paper is formed on a screen or the like where the fibrous material is dewatered to form the paper. The retention of fibers in the paper both increases yield of the paper product and reduces fiber particulates in the mill waste stream, which can increase the cleanup burden. Thus, small quantities of the flocculant polymers can be combined with the paper forming material to reduce fiber loss from the material during dewatering. The use of cationic or anionic polyacrylamide polymers to aid in paper dewatering is described in U.S. Pat. No. 4,795,531 to Sofia et al., entitled "Method for Dewatering Paper," incorporated herein by reference. To improve the dewatering aid, a portion of high molecular weight PEO can be combined with the polyacrylamide to form a flocculant polymer blend. The blend can comprise from about 1 weight percent to about 40 weight percent PEO, in other embodiments from about 5 weight percent to about 38 weight percent PEO and in further embodiments from about 10 weight percent to about 35 weight percent PEO, and in some embodiments the remainder of the flocculant polymer can be cationic polyacrylamide. A person of ordinary skill in the art will recognize that additional ranges of PEO polymer in a blend of flocculant polymers within the ranges above are contemplated and are within the present disclosure.

Figure 4:
FIG. 4 is a side view of 7 samples of flocculant polymers in a suspension following settling.

Suspended samples of high molecular weight PEO polymers alone or mixed with polyacrylamide (PAM, 30% anionic) were prepared with PEG 400 suspending liquid. Several different brands of high molecular PEO were tested with similar results. The samples are mixed in a jar and allowed to settle. When mixed the suspensions produced a liquid that was uniform to visual inspection. The polymer particles gradually settled toward the lower portion of the jar. FIG. 4 shows seven samples following settling, which was observed to generally take place over roughly 5-7 hours. The composition of these samples in weight percent is as follows from left to right.

1. 70% PEG 400, 15% PEO, 15% PAM
2. 82% PEG 400, 18% PEO
3. 80% PEG 400, 20% PEO
4. 70% PEG 400, 30% PEO
5. 80% PEG 400, 10% PEO, 10% PAM
6. 80% PEG 400, 10% PEO, 10% PAM
7. 80% PEG 400, 20% PEO

After settling, the polymers could be easily re-suspended into a visually homogenous liquid through simple swirling of the jars. After re-suspension, the polymer would then settle again over the course of several hours.

The embodiments above are intended to be illustrative and not limiting. Additional embodiments are within the claims. In addition, although the present invention has been described with reference to particular embodiments, those skilled in the art will recognize that changes can be made in form and detail without departing from the spirit and scope of the invention. Any incorporation by reference of documents above is limited such that no subject matter is incorporated that is contrary to the explicit disclosure herein.

What is claimed is:

1. A method for treating a liquid, the method comprising:
   delivering a powder blend of flocculating polymers from a reservoir into an aqueous treatment stream at a selected concentration, the delivering process comprising:
   1) directly delivering powder blend into the aqueous treatment stream; and/or
   2) directly delivering the powder blend into a dilution water flow to form an initial aqueous combination that is flowed into the aqueous treatment stream,
   wherein the powder blend comprises a particulate water soluble flocculant polymer different from polyDadmac having a molecular weight of more than 1,000,000 g/mol and polyDadmac and wherein the flocculant powder comprises cationic polyacrylamide.

2. The method of claim 1 wherein the flocculant polymer is polyethylene oxide and wherein the flocculant polymer has a particulate size providing for dissolving into water at low concentration in no more than about 5 minutes.

3. The method of claim 1 wherein the powder blend is formed into an aqueous combination prior to delivering it into the treatment stream, wherein the polyDadmac is not fully dissolved when the aqueous combination is delivered into the treatment stream, and wherein the aqueous combination enters the treatment stream within 5 minutes of forming the combination.

4. The method of claim 3 wherein the aqueous combination is delivered it into the treatment stream in no more than 60 seconds.

5. The method of claim 3 wherein the aqueous combination is delivered into the treatment stream in no more than 15 seconds.

6. The method of claim 1 wherein the treatment stream originates from coal mining, mineral mining operation, fiber dewatering, paper processing or paper sheet formation.

7. The method of claim 1 wherein the treatment with the flocculant polymers provides or facilitates water clarification, suspended solids separation, treatment flow thickening, dissolved air floatation, selective mineral separation, dredging, belt press or centrifuge dewatering, settling pond or reservoir impoundment, paper sheet formation, stickies control, paper drainage aid, and/or fiber dewatering.

8. The method of claim 1 wherein the treatment stream is delivered to a settling tank.

9. The method of claim 8 wherein the delivery into the treatment stream is performed at least 5 meters from the inflow into the settling tank.

10. The method of claim 1 wherein the polyDadmac has an average molecular weight of at least about 100,000 g/mole and an average particle size from about 0.5 microns to about 150 microns.

11. The method of claim 1 wherein the flocculating polymer comprises polyethylene oxide having an average molecular weight from about 3,000,000 g/mol to about 15,000,000 g/mol.

12. The method of claim 1 wherein the powder blend comprises particulate polyethylene oxide having at least about 60 weight percent of the particles having a particle diameter of no more than about 75 microns.

13. The method of claim 1 wherein the powder blend has from about 5 to about 45 weight percent polyethylene oxide.

14. The method of claim 1 wherein the powder blend has a concentration of flocculant polymer from about 1 weight percent to about 60 weight percent.

15. The method of claim 1 wherein the powder blend comprises at least about 5 weight percent polydadmac.

16. The method of claim 15 wherein the powder blend comprises at least about 40 weight percent cationic polyacrylamide.

17. The method of claim 1 wherein the aqueous combination is delivered it into the treatment stream in no more than 60 seconds and wherein the polyDadmac is not fully dissolved when the aqueous combination is delivered into the treatment stream.

* * * * *